United States Patent Office 2,834,436
Patented May 13, 1958

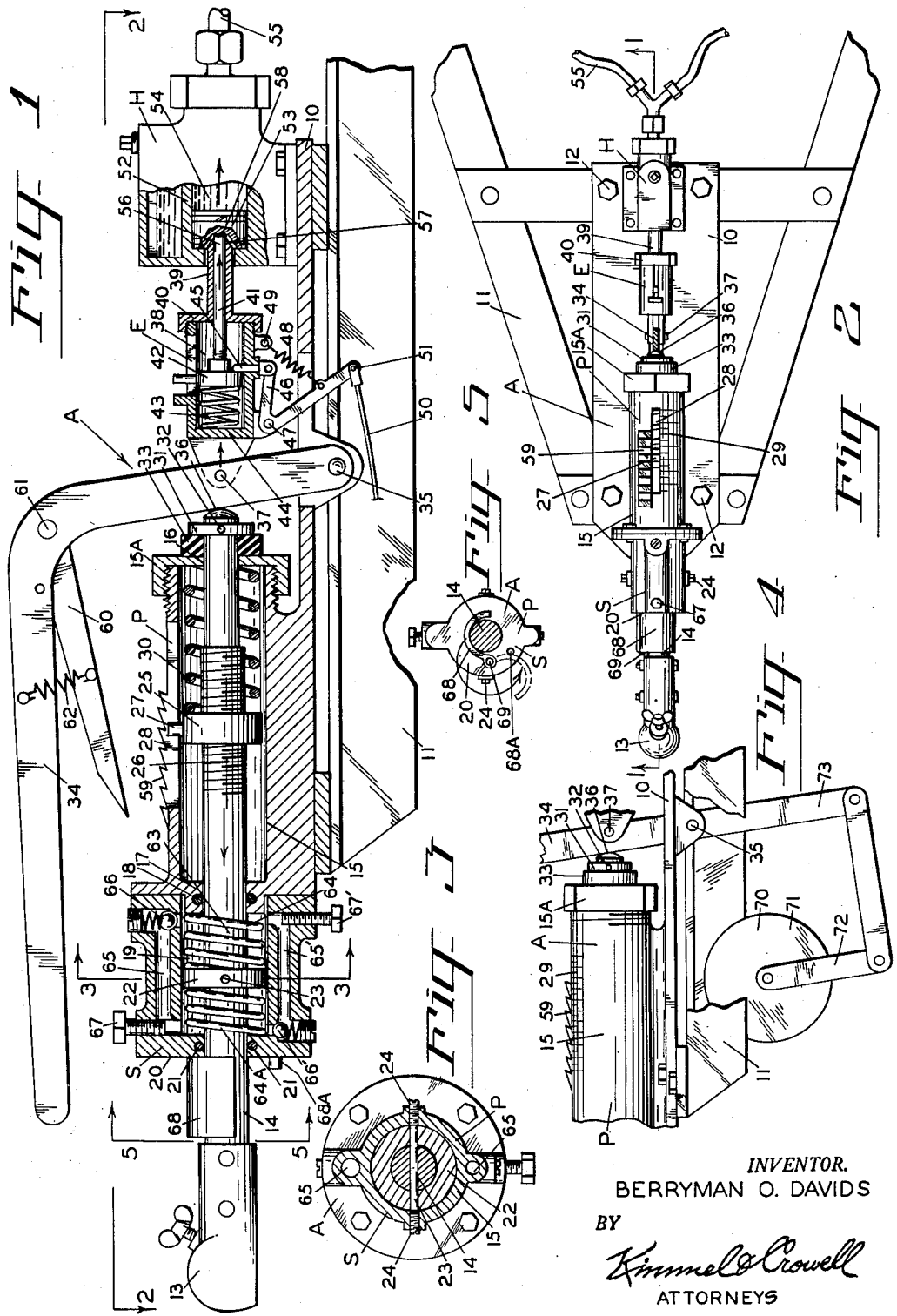
May 13, 1958     B. O. DAVIDS     2,834,436
AUTOMATIC BRAKE APPLICATOR
Filed Nov. 21, 1955
*INVENTOR.*
BERRYMAN O. DAVIDS
BY
*Kimmel & Crowell*
ATTORNEYS

2,834,436
AUTOMATIC BRAKE APPLICATOR
Berryman O. Davids, Longview, Wash.

Application November 21, 1955, Serial No. 547,910

1 Claim. (Cl. 188—112)

This invention relates to automatic brake applicators and is particularly adapted to be used in connection with trailers drawn by tractor vehicles and the like.

The primary object of this invention is to provide an automatic brake applicator for the trailer brakes that will be actuated by the overrun momentum of the trailer when the brakes of the tractor vehicle are being applied.

A further object of this invention is to provide means of controlling the amount of brake application applied to the trailer depending upon the weight of the trailer and its load.

Another object of this invention is the provision of a brake applicator that will have an automatic means within the same for controlled cushioning of the trailer when the brakes are being applied or released.

A further object of the invention is to provide a means of controlling the brake pressures to the trailer brakes throughout the entire range.

A still further object of this invention is to cushion the ride of the trailer in regards to forward and backward movement while in transit.

Another object of this invention is the provision of a mechanism associated with the brake applicator that will apply a predetermined amount of brake application to the trailer in the event the trailer becomes disconnected from the tractor vehicle.

Other objects and advantages will become apparent in the following specification when considered in the light of the attached drawings, in which:

Figure 1 is a longitudinal cross section of the invention, taken on line 1—1 of Figure 2, looking in the direction of the arrows;

Figure 2 is a horizontal cross section of the brake applicator, taken on line 2—2 of Figure 1;

Figure 3 is a transverse cross section, taken on line 3—3 of Figure 1, looking in the direction of the arrows;

Figure 4 is a fragmentary side elevation of a modified form of shock absorbing device; and, Figure 5 is a transverse cross section taken on line 5—5 of Figure 1, looking in the direction of the arrows.

Referring now to the drawings in detail wherein like reference numerals indicate like parts throughout the several figures, the reference numeral A generally indicates a trailer brake applicator which includes four combined units; a hydraulic brake applying unit H, an emergency brake applicator E, a brake pressure control unit P and a shock absorbing unit S. All of these units are mounted to a base 10.

The base 10 is mounted to a tongue 11 of a trailer (not shown), by bolts 12. A conventional ball and socket trailer hitch 13 is fixedly secured to horizontal shaft 14 in the usual manner.

The shaft 14 operates within an elongated body 15. Shaft 14 is slidably mounted within a bearing 16 at one end of the body 15 and within a bearing 17 at the opposite end of the member 15, an oil seal 18 is associated therewith in the usual manner. The shaft 14 also extends through an oil cylinder 19, forming part of the hydraulic shock absorber S, and projecting through the end 20 through an oil seal ring 21.

A piston 22 is fixedly secured to the shaft 14 by a pin 23. When the piston 22 is in the position shown in Figure 2, the pin 23 can be removed or replaced through plug openings 24 so that the shaft 14 can be assembled or disassembled within the above units. An adjustable nut 25 is threaded to the threads 26 formed on the shaft 14. The nut 25 has a pointer 27 formed thereon and operating within the groove 28 of the elongated body 15. The pointer 27 cooperates with the mark 29 formed along the edge of the slot or groove 28.

Bearing against one side of the nut 25 is a spring 30 which has its opposite end bearing against the end 15A of the elongated member 15. This tends to force the shaft 14 in the direction of the arrow at all times. The movement in the direction of the arrow of the shaft 14 is limited by the collar 31 which is keyed to the shaft 14 by the key 32. A resilient bushing 33 is disposed between the collar 31 and the end 15A of the body 15. A parking lever 34 is pivotally mounted to the base 10 at 35. This lever 34 bears against the end 36 of the shaft 14 and has the automatic brake applicator E pivotally mounted thereto at 37.

The applicator E consists of a chamber 38, having a hollow plunger 39 formed on the removable end 40. Operating within this plunger 39 is a plunger 41. The plunger 41 has a head or piston 42 forming part thereof and operating within the chamber 38. A spring 43 bears against this head 42 at its one end and against the end 44 of the chamber 38 at its opposite end, forcing the plunger 41 always in the direction of the arrow, the object of which will be later described.

The head or piston 42 is held in the position shown in Figure 2 by the stop pin 45. This stop pin 45 is journalled through one side of the chamber 38 and is held in the position shown, by the bell crank 46, which is pivotally mounted to the unit E at 47. A spring 48 has one end secured to the crank 46 and the other to the unit E at 49. This tends to hold the stop pin 45 in the position shown behind the head or piston 42 and the plunger 41.

A cable or pull rod 50 is secured to the lever 46 at 51 and to the tractor vehicle. The purpose of this mechanism will be later more fully described.

The hydraulic brake applicator H consists of the cylinder 52 having the usual hydraulic piston 53 operating therein against the fluid 54. This fluid 54 is forced out through the hydraulic fluid lines 55 to the brakes (not shown) on the trailer. The tip 57 of the hollow plunger 39 and the end 56 of the plunger 41 are adapted to contact the piston 53 at 58. This operation will be fully described later.

A ratchet 59 is formed on the elongated member 15 and is adapted to cooperate with the pawl 60, which is pivotally mounted at 61 to the lever 34. The pawl 60 is held out of engagement with the ratchet 59 by the spring 62 when the holding brake of the trailer is not applied. The lever 34 operates a holding brake in a manner which will be fully described later.

The shock absorbing unit S associated with the brake applicator H consists of the cylinder 19 in which the piston 22 operates within the space 63. Springs 64 and 64' tend to center the piston 22 within the cylinder 19, as best illustrated in Figure 1.

The operation of the shock absorber unit S is as follows: As the piston 22 is moved forward or backward within the cylinder 19, the fluid within the space 63 is forced from one side of the piston 22 to the other by way of the ports 65 and 65'. Located within these ports 65 and 65' are check valves 66 and 66'. Also within these ports 65 and 65' are located adjustable bypass valves 67 and 67'. The operation of this shock absorbing unit S will be described later.

When the trailer is backed up it is desirable not to apply the brakes of the trailer, therefore a holding member 68 in the form of a spacer is pivotally mounted to the body of the applicator A at 69. In Figures 1 and 5 this holder is shown in holding position. In Figure 5, the broken lines illustrate how the holding member is moved out of holding position, and supported by a stop lug 68a.

Referring to Figure 4, an alternate type of shock absorbing mechanism is illustrated. This shock absorbing mechanism consists of a conventional pivoted arm type of shock absorber employed on motor vehicles and is indicated by numeral 70. The shock absorber 70 is fixedly secured to the trailer tongue 11 or to the brake applicator H. It consists of a shock absorber mechanism (not shown) housed within the housing 71, and the shock absorber arm at 72. This arm 72 is connected to the extension 73 of the holding brake lever 34. The shock absorber 70 has an adjustment (not shown) to vary the resistance to the movement of the arm 72 differently in one direction then in the other. By using this type of shock absorber 70, the shock absorber unit S could be omitted from the brake applicator H as illustrated in the drawings, except in Figure 4. With the design used in Figure 1, there is a wide range of adjustment while that shown in Figure 4 is somewhat limited in its range of adjustment.

The operation of this new and improved trailer brake applicator will now be described. When the brakes on the tractor vehicle are applied, the momentum of the trailer will move the elongated body 15 and the cylinder 19 of the shock absorber S in the direction of the arrow or forwards toward the tractor vehicle against the tension of the spring 30, also against the tension of the spring 64. When this happens the end 36 of the shaft 14 engages the parking lever 34, forcing the same in the direction of the arrow, including the emergency brake applicator E.

The hollow plunger 39 and the end 57 of the plunger 41 engage the piston 53 at 58 forcing the same in the direction of the arrow, expelling the brake fluid 54 into the brake lines 55 to the brakes on the trailer. It has been found in experience that an oscillating movement then normally begins to take place in regard to the shaft 14, which is most undesirable, or this same movement will begin to take place after the brakes have been applied and an ordinary braking application is being made.

In order to combat this oscillation and to prevent it, the shock absorber unit S is brought into action in the following manner. When the piston 53 moves in the opposite direction of the arrow when the brakes are being applied, it will expel the fluid from the space r or chamber 63 out through the check valve 66, through the port 65, through the adjustable needle valve 67 into the space 63 on the opposite side of the piston 22. The needle valve 67 is adjusted for the proper opening depending upon the weight of the trailer and its load. This absorbs any tendency of the shaft 14 to vibrate or to move in an oscillating movement in the opposite direction of the arrow.

The tendency of the piston 53 to move in the direction of the arrow during this oscillating tendency will expel the fluid from the chamber 63, through the check valve 66', port 65' and through the adjustable needle valve 67' back into the space 63 from the opposite side of the piston 22. The adjustment of this needle valve will be somewhat different because of the following reason.

When the brakes are being applied on the trailer it is desired to permit the piston 53 within the shock absorber unit S to move faster than it will be allowed to move when the brakes are released or when the shaft 14 moves in the opposite direction. The reason for this is to break up any rhythmic oscillating movement that would be set up ordinarily within the shaft 14.

By considerable experimental development, it has been found that this oscillation was set up on applying the brakes suddenly and that a means had to be provided for eliminating this oscillating movement and this is one of the outstanding objects of this invention.

In Figure 4, there is illustrated how a regular well known type of shock absorber 70 having these characteristics could be applied to the brake holding lever 34 accomplishing somewhat the same results, but without such a wide range of control.

In the event that the trailer should break away from the tractor vehicle the emergency brake applicator E will go into operation in the following manner. The cable or rod 50 connected to the bell crank 46 at its one end and the opposite end being connected to the tractor vehicle will withdraw the holding bar 45 from behind the head or piston 42, permitting the spring 43 to force the plunger 41 in the direction of the arrow, forcing the hydraulic piston 53 against the fluid 59 applying the brakes on the trailer sufficient to stop the trailer, but not with such pressure as to slide the wheels.

The amount of application applied to the brakes will be governed by changing the tension of the spring 48 either by changing the spring itself or providing means of adjusting the same. This safety feature device will possibly very seldom be used if at all in practice, but in the event it does become necessary to be used the same can be released by disconnecting the unit E from the holding lever 34, allowing the piston 53 of the brake applicator H to return to the released position, after which the emergency applicator can be replaced by moving the head of the piston 42 against the spring 43 and behind the holding pin 45.

When it becomes necessary to park the trailer the holding lever 34 is grasped by the operator and moved so as to move the said lever and the plungers 39 and 41 against the piston 53 locking the said holding lever in the brake applied position by way of the pawl 60 engaging the ratchets 59.

While it has been illustrated how the brake applicator is used in connection with a hydraulic system, it should be understood that this applicator can be used in connection with hand controlled rheostat electric systems, or hand controlled air brake systems.

When the spring 30 has been adjusted properly for the weight and load of the trailer and the bypass ports 65 and 65' associated with the shock absorber unit S are properly adjusted for this particular trailer, it has been very difficult to realize that the tractor vehicle was towing a trailer in degree of brake application to the tractor and trailer.

In the operation of trailer brake systems now in use, it has been found that the human element does not respond quickly enough or accurately enough to properly apply the brakes.

Having thus described the preferred embodiments of the invention, it should be understood that numerous modifications and structural adaptations may be resorted to without departing from the scope of the appended claim.

What is claimed is:

An automatic inertia brake operator for trailer vehicles comprising a trailer frame, a housing mounted on said frame, a shaft mounted for longitudinal reciprocation in said housing, a trailer coupling mounted on said shaft, a hydraulic shock absorber mounted on said housing and engaging said shaft to restrain the longitudinal oscillating movement of said shaft, a spring mounted in said housing, an adjustable stop on said shaft engaging said spring, a brake actuator mounted on said housing, a lever operatively connected to said brake actuator and engaging said shaft whereby reciprocating movement of said shaft will move said lever and operate said brake actuator, said lever being hand operative to operate said brake actuator when the trailer is parked, and an emergency spring operator in said brake actuator to operate said actuator on disconnection of said trailer from a towing vehicle.

References Cited in the file of this patent

UNITED STATES PATENTS

| | | |
|---|---|---|
| 1,315,570 | Paris | Sept. 9, 1919 |
| 2,149,189 | Shaffer | Feb. 28, 1939 |
| 2,162,029 | Paul | June 13, 1939 |
| 2,261,220 | Brown | Nov. 4, 1941 |
| 2,401,084 | Laudahl | May 28, 1946 |
| 2,476,003 | Symmonds | July 12, 1949 |
| 2,625,243 | Jones | Jan. 13, 1953 |
| 2,630,888 | Fikse | Mar. 10, 1953 |

FOREIGN PATENTS

| | | |
|---|---|---|
| 714,400 | Great Britain | Aug. 25, 1954 |